US008869308B2

(12) United States Patent
Soffer

(10) Patent No.: US 8,869,308 B2
(45) Date of Patent: Oct. 21, 2014

(54) COMPUTER MOTHERBOARD HAVING PERIPHERAL SECURITY FUNCTIONS

(75) Inventor: Aviv Soffer, Caesarea (IL)

(73) Assignee: High Sec Labs Ltd., Yokneam (IL)

(*) Notice: Subject to any disclaimer, the term of this patent is extended or adjusted under 35 U.S.C. 154(b) by 0 days.

(21) Appl. No.: 13/699,217

(22) PCT Filed: May 18, 2011

(86) PCT No.: PCT/IL2011/000394
§ 371 (c)(1),
(2), (4) Date: Nov. 20, 2012

(87) PCT Pub. No.: WO2011/145095
PCT Pub. Date: Nov. 24, 2011

(65) Prior Publication Data
US 2013/0067534 A1    Mar. 14, 2013

Related U.S. Application Data

(60) Provisional application No. 61/346,471, filed on May 20, 2010.

(51) Int. Cl.
G06F 21/04    (2006.01)
G06F 3/02     (2006.01)
G06F 21/85    (2013.01)
G06F 21/83    (2013.01)
G06F 21/84    (2013.01)
G06F 21/34    (2013.01)

(52) U.S. Cl.
CPC .............. G06F 21/84 (2013.01); G06F 3/0227 (2013.01); G06F 21/85 (2013.01); G06F 21/83 (2013.01); G06F 21/34 (2013.01)
USPC ........................................... 726/34; 713/189

(58) Field of Classification Search
None
See application file for complete search history.

(56) References Cited

U.S. PATENT DOCUMENTS

| 6,820,160 | B1  | 11/2004 | Allman |
| 7,320,071 | B1  | 1/2008  | Friedman et al. |
| 7,478,235 | B2  | 1/2009  | England et al. |
| 7,559,092 | B2* | 7/2009  | Anson et al. ............ 726/34 |
| 7,635,272 | B2  | 12/2009 | Poppe |
| 7,677,065 | B1  | 3/2010  | Miao |
| 7,945,792 | B2* | 5/2011  | Cherpantier .......... 713/194 |
| 8,090,961 | B2* | 1/2012  | Yoffe et al. .......... 713/193 |
| 2005/0138433 | A1 | 6/2005 | Linetsky |

(Continued)

FOREIGN PATENT DOCUMENTS

| WO |    03009118 A2 | 1/2003 |
| WO | 2004107181 A1 | 12/2004 |
| WO | 2006062951 A1 | 6/2006 |
| WO | 2006090091 A1 | 8/2006 |

Primary Examiner — Gilberto Barron, Jr.
Assistant Examiner — Wayne An
(74) Attorney, Agent, or Firm — Browdy and Neimark, PLLC

(57) ABSTRACT

A secure motherboard for a computer, wherein each user accessible peripheral port is protected by hardware based peripheral protection circuitry soldered to the motherboard. The protection circuitry provides security functions decreasing the vulnerability of the computer to data theft. User input ports such as keyboard and mouse peripheral ports are coupled to the computer through a security function that enforce unidirectional data flow only from the user input devices to the computer. Display port uses a security function which isolates the EDID in the display from the computer. Authentication device such as smart card reader is coupled to the computer via a port having a security function which enumerates the authentication device before coupling it to the computer.

18 Claims, 7 Drawing Sheets

(56) References Cited

U.S. PATENT DOCUMENTS

| | | |
|---|---|---|
| 2008/0148339 A1 | 6/2008 | Hill et al. |
| 2009/0013111 A1 | 1/2009 | Berland et al. |
| 2009/0033668 A1 | 2/2009 | Pederson et al. |
| 2009/0064273 A1* | 3/2009 | Buer ................................ 726/1 |
| 2009/0212844 A1 | 8/2009 | Darmawan et al. |
| 2010/0023744 A1 | 1/2010 | Markel |

* cited by examiner

COMPUTER MOTHERBOARD HAVING PERIPHERAL SECURITY FUNCTIONS

FIELD OF THE INVENTION

The present invention relates to a computing device motherboard having secure peripheral port functions. More particularly, the invention discloses a set of hardware base peripheral security functions to allow computer users to use only permitted peripheral devices such as keyboard, mouse and user authentication device. The embodiment disclosed in this invention may be used to build a higher security personal computer, thin-client, workstation, laptop, notepad or server having reduced information security vulnerabilities from peripheral devices.

BACKGROUND OF THE INVENTION

Data theft from computers is a serious risk in many organizations. The common use of data storage devices such as USB flash drives, digital cameras, media players and mobile phones that can be easily interfaced with any PC is big challenge to most organizations. Users may easily download huge files in few seconds without leaving any traces. Data theft from computer systems may disclose secret military plans, private medical records, bank accounts information, insurance data, customer database or any other type of data that may be sold or used against the organization interests. Another risk is the data import (or upload) from storage devices that may load hostile code into the organization computing system. A single event of unauthorized data import into the organization network may cause complete system failure for few hours or even few days. Data Loss Prevention (DLP) becomes a common practice or even mandatory in many high security organizations including: financial, healthcare, government and defense. Over the past years there were several common strategies to secure computer peripheral ports:

1. Security policy regarding mass storage devices.
   Some organizations prohibit users from entering the facility carrying mass storage devices, and some conduct searches at the entrance gate. While this method may be efficient deterrent, it is enough that one employee will bring one device to cause severe damage to the whole organization. It is also very difficult to enforce this policy as there are many devices that their secondary function may be mass-storage device. For example—a watch, music player, GPS device, etc. Additionally, due to the miniature size of flash memory storage devices, they are easy to conceal.
2. Physical removal or cover of unused ports.
   Many organizations are using brute force to remove unused peripheral ports from computers that they are purchasing. While this method reduces the risks of open ports, it still allows users to remove allowed peripheral such as keyboard or mouse and plug unauthorized peripheral such as portable mass storage device. It is also expensive task to treat every purchased computer and may void the manufacturer's warranty.
3. USB ports protection by software.
   This method is in extensive use today and it enables complete port disable, or specific port filtering. Organizations may use these software applications to enable only keyboard and mouse to be attached to their computers. One major drawback of any software protection is that it may be disabled or modified by a sophisticated attacker with relative ease. For example see product information at available from DeviceLock, 3130 Crow Canyon Pl, Suite 215, San Ramon, Calif. 94583, USA.
4. Use of secure KVM to secure coupled computers peripheral ports.
   Several secure KVM offering full peripheral ports protection through emulation and unidirectional flow diodes. Combining with USB ports physical or software protection this method may be used to protect peripheral ports. Another potential option used today is that the PC is co-located or locked for user access while only secure KVM with protected ports is accessible. While this method is relatively secured and efficient, it is only applicable for users having multiple computers at their desktop.

Prior-art solutions for peripheral ports security are mostly relying on application software. Software products like DeviceLock, available from 3130 Crow Canyon Pl, Suite 215, San Ramon, Calif. 94583, USA are adding an MMC snap-in to the group-policy to enable full control of the computer peripheral ports. The main drawback of this solution—just like any other software, professional attacker may alter or completely disable this software to allow full access to peripheral ports. Software components responsible for tracking and reporting software integrity can be modified as well to prevent detection and reporting of such attack.

U.S. Pat. No. 7,320,071 discloses a method and apparatus to provide a secure universal serial bus domain in a security partitioned computer. Such method may be used to create a computer motherboard having two or more USB port trees with different security levels but does not provide protection from unauthorized data import and export. The disclosed method and apparatus also does not provide a way to filter standard peripheral such as keyboard and mouse.

U.S. Pat. No. 7,635,272 discloses a mechanical USB port locking and blocking device that may be used to prevent USB cable disconnect from the computer or prevent unauthorized use of blocked USB ports. This mechanical method may be efficient method for peripheral devices anti-theft but it fails to protect used ports (such as keyboard and mouse) from cable cut attacks or other sophisticated electronic attacks. It also fails to protect other types of computer ports commonly available in standard computers from data theft.

U.S. Pat. No. 7,478,235 discloses a methods and systems for protecting data in USB systems. The disclosed method directed to providing authenticated and confidential messaging from software executing on a host (e.g. a secure software application or security kernel) to and from I/O devices operating on a USB bus. The embodiments can protect against attacks that are levied by software executing on a host computer. The disclosed method does not provide protection from unauthorized peripheral devices used and does not provide a method to restrict data import and export risks from such system. The disclosed method is further relying on software application together with hardware functions. This dependence on software tends to reduce the system security as opposed to pure hardware security solutions. It also depending on the operating system and does not provide pre-boot protection.

U.S. Pat. No. 7,677,065 discloses a mechanical combination lock for a USB connector that may be used to lock peripheral devices USB ports. Although a lock like that may prevent users from inserting a USB storage device into their computer, it is impractical to secure all portable storage devices that exist in large organizations. It is much more practical and secure to lock the receptacle side—all USB ports accessible to the users.

United States Patent Application 20090013111 discloses a unidirectional USB Port primarily for use to connect an election machine. While the disclosed method may be used to secure computer USB ports against data export, it lacks the emulation capabilities and therefore cannot be used between standard peripherals and computers.

U.S. Pat. No. 6,820,160 discloses an apparatus for optically isolating a USB peripheral from a USB host. The apparatus disclosed in this patent uses bi-directional optical isolators to provide electrical and ground isolation between computer host and peripherals. While this apparatus may be used to protect computer peripheral ports from power spikes and induced noise, its design is inherently un-secure as it does not provide any host or device emulations and it is bidirectional and therefore data may flow to external peripherals as well. The apparatus disclosed in U.S. Pat. No. 6,820,160 may be used in industrial automation applications to reduce electrical noise and protect from power surge but can not be used to protect a computer from peripheral data leakage risks.

United States Patent Application 20090033668 discloses display EDID emulator system and method. While this patent application discloses a system that emulates EDID, it does not disclose any circuitry that prevents emulated EDID device write or write protection. Without write protection circuitry, data leakage prevention cannot be assured and therefore the system and method disclosed cannot be used for secure applications. The patent also does not disclose emulation or protection of other types of ports.

United States Patent Application 20090212844 discloses an analog circuitry that serves as Information Handling System Port Security. The disclosed system uses certain analog electronic components to sense the presence of a removable peripheral device and to control the power source to that device accordingly. Such system may not be used to detect the type of attached device or to prevent data import or export from the device. The disclosed method and apparatus may not detect externally powered mass storage peripheral devices and does not have proper security means to prevent boot or data transfer to such device.

What is needed is a computer that comprises a built-in, hardware based, peripheral protection circuitry to secure each one of the user-accessible peripheral ports. A security function that will prevent data export by hardware means independent of computer BIOS, operating-system or applications.

OTHER REFERENCED PATENTS AND APPLICATIONS

US publication 2011/0145451 to the inventor of the present invention discloses an apparatuses and systems for operating multiple computers from a single console using a secured KVM device, while preventing information leakage between the computers. The system comprises several hosts connected through a secured KVM device to keyboard and mouse and one or more user displays. Secured KVM enables standard bi-directional communication between Secured KVM and user keyboard and mouse and between hosts peripheral ports and Secured KVM. Secured KVM physically enforces unidirectional data flow from attached keyboard and mouse to attached hosts peripheral ports to avoid potential leakages between hosts.

Other references are as follows:
1. U.S. Pat. No. 7,320,071—Secure universal serial bus.
2. U.S. Pat. No. 7,635,272—USB port locking and blocking device.
3. U.S. Pat. No. 7,478,235—Methods and systems for protecting data in USB systems.
4. U.S. Pat. No. 7,677,065—Lock for a USB connector.
5. United States Patent Application 20090013111—Unidirectional USB Port.
6. U.S. Pat. No. 6,820,160—Apparatus for optically isolating a USB peripheral from a USB host.
7. United States Patent Application 20090033668—Display EDID emulator system and method.
8. United States Patent Application 20090212844—Information Handling System Port Security.

SUMMARY OF THE INVENTION

The present invention, relates to a high-security computer motherboard having secure peripheral ports. More particularly, the invention presents a special secure computer motherboard that enables data input from authorized user peripheral devices but prevents usage of unauthorized peripheral devices, potential data theft and unauthorized data import. Computer motherboard having the security functions disclosed here may be used for plurality of computer devices such as: personal computer desktops, thin-clients, laptop computers, tablet computers, PDAs, cellular phones etc.

According to an exemplary embodiment of the current invention, a secure computer motherboard is provided, comprising:

A computer enclosure having a secure motherboard wherein each accessible peripheral port is protected by peripheral protection circuitry soldered to the said secure motherboard. Keyboard peripheral port protection comprises of a keyboard host emulator function coupled to the dedicated keyboard peripheral port at one side and to the unidirectional flow forcing function at the other side. Keyboard host emulator communicates with the user keyboard through standard bidirectional peripheral protocol such as USB and translates user key-codes into standard or proprietary unidirectional serial protocol. This standard or proprietary serial protocol is then passed through a unidirectional flow forcing function to assure that data will only flow from the keyboard host emulator function to the keyboard device emulator. Unidirectional data flowing into the keyboard device emulator is translated back into a standard bidirectional peripheral protocol and coupled with the computer I/O hub or chipset peripheral port. This keyboard peripheral security function assures that data cannot flow back into the keyboard port and also assures that only qualified keyboard will be enumerated and supported by the computer.

Similarly the mouse host emulator communicates with the user mouse through standard bidirectional peripheral protocol such as USB and translates user inputs into standard or proprietary unidirectional serial protocol. This standard or proprietary serial protocol is then passed through a unidirectional flow forcing function to assure that data will only flow from the mouse host emulator function to the mouse device emulator. Unidirectional data flowing into the mouse device emulator is translated back into a standard bidirectional peripheral protocol and coupled with the computer I/O hub or chipset peripheral port. This mouse peripheral security function assures that data cannot flow back into the keyboard port and also assures that only qualified keyboard will be enumerated and supported by the computer.

Approved user authentication device may be coupled into the secure motherboard user authentication device dedicated port that is coupled to the user authentication device mode switch. During initial connection or power up, this switch couples the user authentication device dedicated port into the qualification microcontroller function. This qualification microcontroller function enumerates the coupled user authentication device and checks if it is a qualified device based on preprogrammed qualification criterions. The same qualification microcontroller function drives the said user authentication device mode switch. Once the device is qualified the qualification microcontroller move the user authentication device mode switch to couple the connected device to one of the I/O Hub or chipset peripheral ports.

One enhancement of this security function is through the use of a monitoring function that monitors the peripheral port and the traffic after initial qualification to detect certain abnormalities. Once an abnormality is being detected, the monitoring function drives the qualification microcontroller to revert back to qualification mode.

Another further enhancement of this security function is achieved through additional physical/electrical port monitoring function. This function detects physical connector removal, current draw to the device or ground plane continuity to alert the qualification microcontroller in case that device was disconnected from the port.

Alternative embodiment of the present invention may be implemented using a dedicated user authentication peripheral port coupled to a user authentication port host emulator. This host emulator is coupled through a standard or proprietary bidirectional communication link to a user authentication device emulator that is coupled into the computer I/O Hub or chipset peripheral port. This arrangement prevents direct read-write access between the computer port and the device and therefore reduces the risk of data leakages through attacks on the user authentication system.

To further protect the computer the display interface may have an additional Extended Display Identification Data (EDID) security function to prevent unauthorized data import/export from the EDID lines. Depending on the system design, this function may be implemented on the computer motherboard or on a dedicated video card coupled to the motherboard. When the computer boots up, the EDID controller function first isolates the emulated EDID EEPROM device from the controller and then reads the coupled display EDID content. EDID content may be analyzed for integrity and content before EDID controller attempt to write that content into the emulated EDID EEPROM device. To write the EDID content, the EDID controller switches the emulated EDID EEPROM device to the EDID controller and disables its Write Protect function. After EDID content write completed, the EDID controller switches the emulated EDID EEPROM device to the video controller EDID lines to enable normal computer read of emulated EDID content. Trusted Platform Module (TPM) may be added on the motherboard to further enhance computer security. TPM may be coupled to above mentioned peripheral security functions to enable reporting and logging of suspected peripheral ports attack events. It should be noted that peripheral attack events may be aimed at computer port side (internal attacks) or at the secure port side (external attack).

Unlike the prior-art motherboards the secure motherboard of this invention does not have any general purpose peripheral ports such as serial, parallel, USB, fire-wire etc. It also does not support any removable media cards or wireless connectivity such as wireless LAN or Bluetooth.

According to an exemplary embodiment of the current invention, a secure peripherals computer motherboard is provided, the motherboard comprises: a first peripheral security function to secure keyboard peripheral port comprising of: keyboard device emulator coupled to one computer peripheral port to emulate user keyboard; keyboard host emulator coupled to a dedicated user keyboard port to emulate computer host; unidirectional flow forcing circuitry to assure that data is only flowing from said keyboard host emulator to said keyboard device emulator and no other data may flow from the said keyboard device emulator to the said keyboard host emulator; second peripheral security function to secure mouse peripheral port comprising of: mouse device emulator coupled to one computer peripheral port to emulate user mouse; mouse host emulator coupled to a dedicated user mouse port to emulate computer host; unidirectional flow forcing circuitry to assure that data is only flowing from said mouse host emulator to said mouse device emulator and no other data may flow from the mouse device emulator to the mouse host emulator, wherein all unsecured peripheral ports are not exposed to the user.

In some embodiments the secure computer motherboard further having an additional user authentication device port security function comprising of: a user authentication device dedicated peripheral port to connect a qualified user authentication device; a user authentication device port peripheral switch to couple the said dedicated user authentication peripheral port to a qualification microcontroller function or to one computer peripheral port; and a qualification microcontroller to emulate computer host to allow coupled user authentication peripheral device enumeration and qualification and upon successful qualification commanding said user authentication device peripheral switch to couple the dedicated peripheral port to the said computer peripheral port.

In some embodiments the user authentication device port security function further comprises an additional port monitoring circuitry, said monitoring circuitry is coupled to the qualification microcontroller to enable detection of user authentication peripheral device disconnect and to command the coupled user authentication device port peripheral switch to switch back the dedicated peripheral port to the qualification microcontroller.

In some embodiments the additional circuitry is comprises a monitor-able USB hub, and wherein said peripheral switch is coupled to one peripheral port through the monitor-able USB hub.

In some embodiments the additional port monitoring circuitry comprises of at least one monitor such as: mechanical connector detector, device ground detector, and device current detector.

In some embodiments the motherboard is further having an additional user authentication device port security function comprising of: a dedicated user authentication device peripheral port to connect user authentication device; a dedicated user authentication device emulator coupled to one computer peripheral port to emulate user authentication device; and a dedicated user authentication device host emulator coupled to the dedicated user authentication device peripheral port on one side and to the said dedicated user authentication device emulator on the other side.

In some embodiments the qualification controller, host emulator, device emulator are field programmable to enable field customization to specific peripherals.

In some embodiments the motherboard is further having an additional EDID (Extended Display Identification Data) security function comprising of: an EDID emulation controller function coupled to display connector EDID signals to enable coupled user display EDID read by EDID emulation controller function; an emulated EDID EEPROM function to store coupled display EDID content; and an EDID mode selector switch controlled by said EDID emulation controller function and coupled to the emulated EDID EEPROM data and clock lines at one side and to one of the two: EDID emulation controller function or computer video controller chip EDID lines, wherein upon power up, said EDID emulation controller function reads the user display EDID content and later it switches the emulated EDID EEPROM using EDID mode selector switch to the EDID emulation controller and writes the EDID content into the emulated EDID EEPROM, and once completed writing, it switches the EDID mode selector switch to couple the emulated EDID EEPROM to the computer video controller chip EDID lines.

In some embodiments the additional EDID security function resides partially or fully in a separate video card that is coupled to the said motherboard.

In some embodiments the motherboard is further having a TPM (Trusted Platform Module) to provide enhanced computer authentication and trust.

In some embodiments the TPM is further coupled with a backup battery and one or more switches to detect and report enclosure opening or physical tampering.

In some embodiments the TPM is further coupled to the said peripheral security functions to detect and report internal or external attacks on peripheral ports.

In some embodiments the motherboard is further having audio circuitry and connectors removed to prevent data leakages through audio signals.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE DRAWINGS

Figure 1:
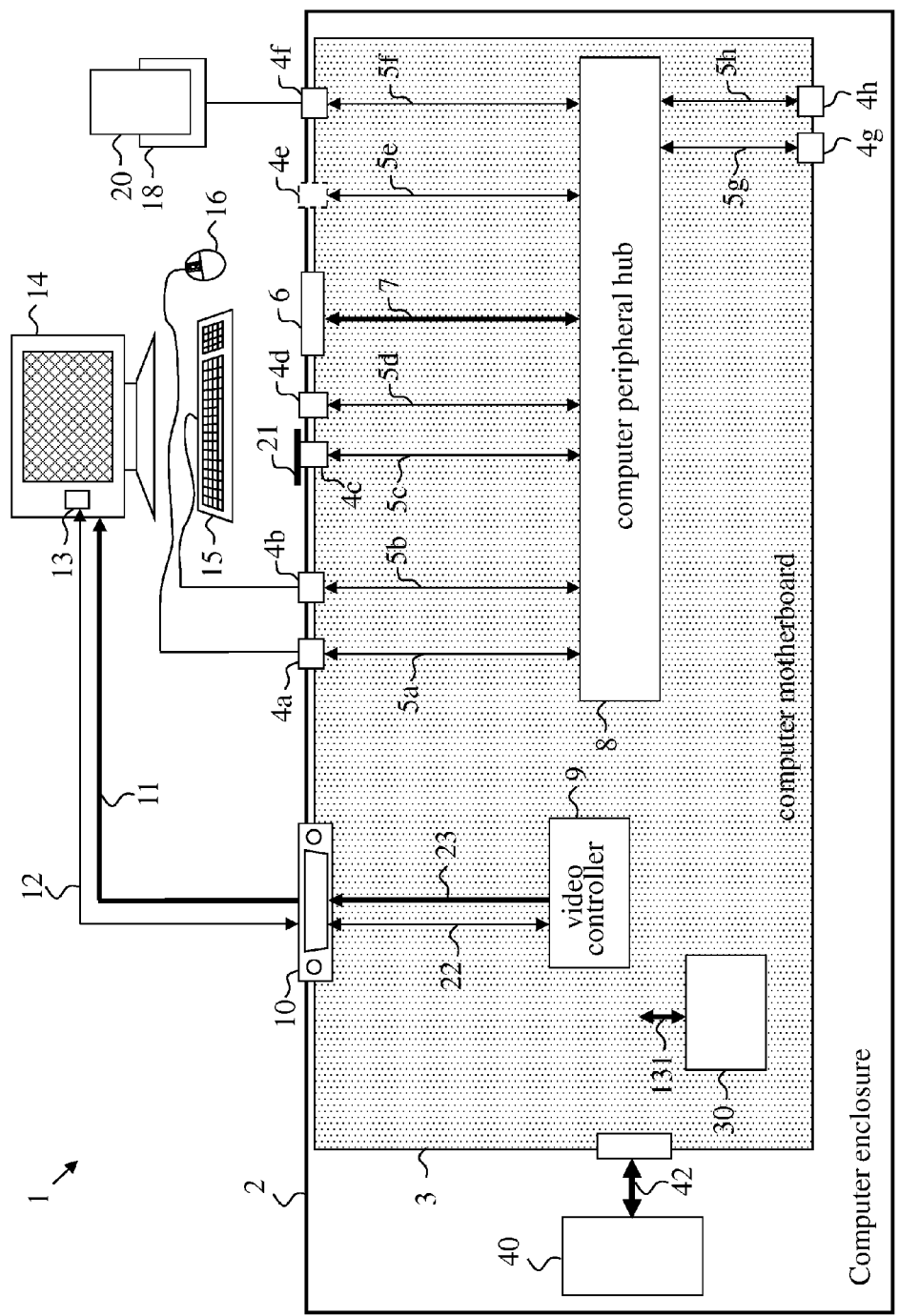
FIG. 1 illustrates a high-level block-diagram of a prior art computer system having software and physical means to protect peripheral ports from unauthorized data imports or export.

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

FIG. 1 illustrates a high-level block-diagram of an exemplary prior-art desktop computer system 1 having software and physical means to protect the peripheral ports.

In this system 1, user display 14 is coupled to the computer enclosure 2 through display cables 11 and 12, display connector 10 soldered to the computer motherboard 3 and coupled to the video chip 9. In some cases the display connector 10 and video controller chip 9 are soldered to a separate video card that is inserted into a connector located on computer motherboard 3.

It should be noted that enclosure 2 and motherboard 3 may be part of a desktop PC, a thin-client, a server, laptop, tablet or any other similar computing device having standard user peripherals. For clarity, components of motherboard 3 which are essential for its operation, but do not required for the understanding of the security measures detailed in this invention were omitted from this and the following figures. These components comprise the CPU, volatile memory, buses, and other components residing on a computer motherboard as known in the art.

User keyboard 15 is coupled through a cable and peripheral port 4b, peripheral line 5b to the computer peripheral hub or chipset 8. Peripheral port 4b is one of the six identical USB ports soldered to the motherboard 3. Two additional USB ports 4g and 4h are wired to the enclosure 2 front panel. Peripheral lines 5a to 5h may have Electro-Static Discharge (ESD) protection means, EMI filters and other electrical and safety protection means not shown here. User mouse 16 is coupled through a cable and peripheral port 4a, peripheral line 5a to the computer peripheral hub or chipset 8.

A user authentication device such as smart-card reader 18 and smart-card 20 is coupled through a cable, peripheral port 4f, peripheral line 5f to the computer peripheral hub or chipset 8. Additional types of peripheral ports such as parallel port 6 coupled through parallel lines 7 to the computer peripheral hub or chipset 8 may exist on motherboard 3. In this prior-art system 1, hard-disk or Solid State Disk (SSD) 40 is used to store software that protects the peripheral ports. This software may be used for example to disable unused ports 4c, 4d, 6, 4e, 4g and 4h. In addition this software may be used to assure that port 4a will only be used with a pointing device class peripheral, port 4b will only be used with a keyboard class peripheral and port 4f will only be used with a user authentication class peripheral. To further illustrate prior-art mechanical peripheral protection means, port 4e USB connector was physically removed from motherboard 3. Another prior-art physical protection means shown in this figure is welded metal plate 21 that is welded to the computer enclosure 2 in a position that blocks unused USB port 4c.

Referring again to the user display 14, in this FIG. 1 display cable is divided into two distinctive lines internally:
1. Video lines 11 used to carry video signals from video controller chip 9, through video lines 23 located on the motherboard 3, display connector 10 to the display 14 video circuitry; and
2. EDID (Extended Display Identification Data) lines 12 used to enable video controller chip 9 to read display Plug and Play data stored in a non-volatile memory device (typically an EEPROM) 13 located inside display 14 through EDID lines 12, display connector 10 and EDID lines 22 located on the motherboard 2.

While this EDID method is desirable from operational aspects, it may be vulnerable from information security standpoint. Simple software loaded into hard-disk or SSD 40 may instruct the video controller chip 9 to copy specific data from the computer to the display connector 10 EDID lines. Serial EDID data may be uploaded or downloaded through the display connector 10 using a specially built mass-storage device having I2C interface.

Trusted Platform Module (TPM) 130 coupled to the computer Low Pin Count (LPC) bus 131 may be implemented on motherboard 3 to add another layer of security. TPM 130 offers facilities for the secure generation of cryptographic keys, and limitation of their use, in addition to a hardware pseudo-random number generator. It also includes capabilities such as remote attestation and sealed storage. "Remote attestation" creates a nearly un-forgeable hash key summary of the hardware and software configuration. The extent of the summary of the software is decided by the program encrypting the data. This allows a third party to verify that the software has not been changed. "Binding" encrypts data using the TPM 130 endorsement key, a unique RSA key burned into the chip during its production, or another trusted key descended from it. "Sealing" encrypts data similar to binding, but in addition specifies a state in which the TPM must be in order for the data to be decrypted (unsealed). A Trusted Platform Module can be used to authenticate hardware devices. Since each TPM chip has a unique and secret RSA key burned in as it is produced, it is capable of performing platform authentication. For example, it can be used to verify that a system seeking access is the expected system. A Trusted Platform Module can also be used to detect and report physical tampering events using micro-switches coupled to enclosure parts and local battery.

It should be noted that in this prior-art system 1 there are several peripheral port security vulnerabilities, for example:
1. User may plug a mass-storage device having USB interface into peripheral ports that were not disabled physically such as 4d, 4g and 4h.
2. User may attack the computer to disable or modify USB security software to enable data download or upload.
3. User may remove or bend the welded metal plate 21 to gain access to USB port 4c.
4. User may attempt to boot the computer from a portable mass storage device attached instead of the mouse 16 to USB port 4a. If this boot is successful, user may gain full access to the data store in hard-disk 40.

Figure 2:
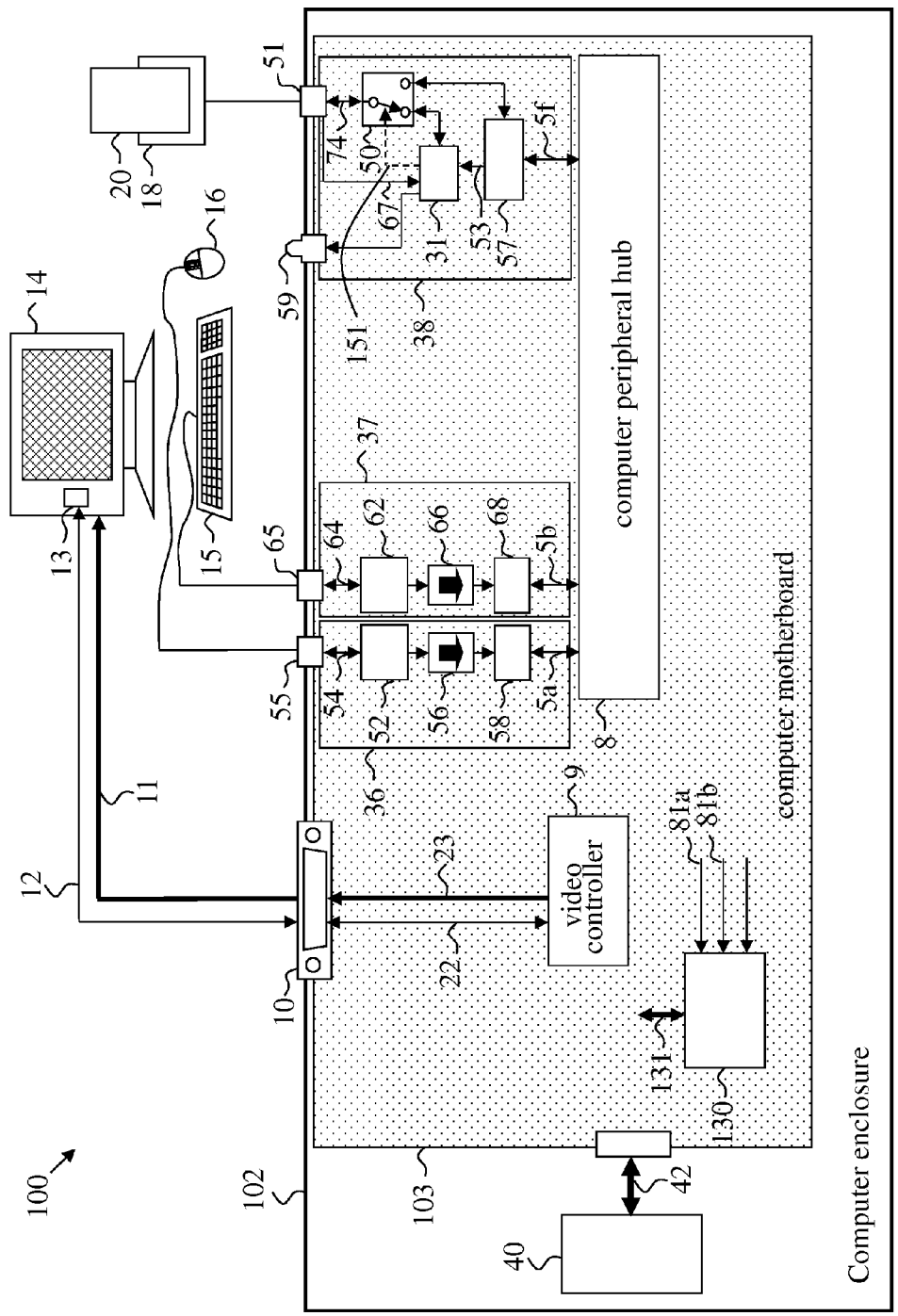
FIG. 2 illustrates a high-level block-diagram of an exemplary computer system of the preferred embodiment of the present invention having keyboard, mouse and user authentication device peripheral ports security functions.

FIG. 2 illustrates a high-level block-diagram of an exemplary desktop computer system 100 of a preferred embodiment of the present invention having peripheral ports security functions.

Desktop PC enclosure 102 is having a secure motherboard 103 of the present invention. In this system 100 user display 14 is coupled to the computer enclosure 102 through display cables 11 and 12, display connector 10 soldered to the computer motherboard 103 and coupled to the video chip 9 similarly to the prior-art system of FIG. 1 above. It should be noted that enclosure 102 and secure motherboard 103 may be part of a desktop PC, a thin-client, a server, laptop, tablet or any other similar computing device having standard user peripherals.

Secure motherboard 103 is having three peripheral security functions:
1. Keyboard peripheral security function 37 to secure the dedicated keyboard peripheral port 65.
2. Mouse peripheral security function 36 to secure the dedicated mouse peripheral port 55.
3. User authentication device peripheral security function 38 to secure the dedicated user authentication device peripheral port 51.

User keyboard 15 is coupled through a cable to a dedicated keyboard peripheral port 65. Dedicated keyboard peripheral port 65 is coupled to the keyboard host emulator 62 through lines 64 contained in the Keyboard peripheral security function 37. Lines 64 may have ESD protection means, EMI filters and other electrical and safety protection means not shown here to prevent cluttering. Keyboard host emulator 62 enumerate and communicate with the coupled keyboard 15 using standard bi-directional peripheral protocol such as USB. Keyboard host emulator 62 is a microcontroller, ASIC, FPGA or any other suitable programmable device running a pre-programmed firmware. The firmware is designed to enumerate/initialize and enable only keyboard class peripheral devices and disable any other coupled devices. For example the following text describes an unknown USB peripheral that is being enumerated by the Keyboard host emulator 62.

When a USB an unknown peripheral device is first connected to the keyboard host emulator 62, the USB device enumeration process is started. The enumeration starts by the keyboard host emulator 62 sending a reset signal to the unknown USB device. The data rate of the unknown USB device is determined during the reset signaling. After reset, the unknown USB device's information is read by the Keyboard host emulator 62 and the device is assigned a unique 7-bit address. If the unknown device is supported by the Keyboard host emulator 62 (based on pre-programmed criterions such as device class, sub-class, Vendor ID, Product ID etc), the keyboard device will be activated or enabled, set to a configured state and will establish standard keyboard communications with the Keyboard host emulator 62. If the USB host inside computer I/O Hub/chipset 8 is restarted, or computer is rebooted while the keyboard device is still connected, the above enumeration process is repeated.

Following enumeration and activation, the Keyboard host emulator 62 sends all keyboard data using a standard (such as RS-232, I2C, SPI) or proprietary unidirectional serial protocol through unidirectional flow forcing circuitry 66 to the keyboard device emulator 68. Both keyboard host emulator 62 and keyboard device emulator 68 may be programmed to map and support not only basic keyboard keys but also multimedia keys, wheel, sliders and any required controls.

The unidirectional flow forcing circuitry 66 may be an optical isolator, electromagnetic isolator, logic driver, RF isolator or any other unidirectional device that may be used to prevent reverse flow of data from keyboard device emulator 68 to keyboard host emulator 62 and potentially to the dedicated keyboard peripheral port 65. Keyboard device emulator 68 receives the standard or proprietary unidirectional keyboard data and translates it back to a standard bi-directional peripheral protocol such as USB, coupled to the I/O hub or chipset 8 peripheral port line 5b. Keyboard device emulator 68 is a microcontroller, ASIC, FPGA or any other suitable programmable device running a pre-programmed firmware. Both keyboard host emulator 62 and keyboard device emulator 68 may be implemented with ROM (Read Only Memory), Fuse protected flash, One Time Programmable (OTP) or other suitable non-volatile memory technology to prevent re-programming security attacks on controllers from the port 65 side or the I/O hub/chipset 8 side.

Keyboard host emulator 62 may further support port power management circuitry to enable control and monitoring of port power to external peripheral and to pass required indications to the coupled computer I/O Hub/chipset 8.

Keyboard host emulator 62 is programmed to support only keyboard devices. If the user or attacker attempts to connect a hub instead, the device will not be qualified and will be disabled. If the user or attacker attempts to connect a composite device having more than one peripheral functions, the Keyboard host emulator 62 will enumerate and enable only one keyboard device contained in the composite device (if exist). If no keyboard device exists in the composite device, the whole device will be disabled.

Similarly, user mouse 16 is coupled through a cable to a dedicated mouse peripheral port 55. Dedicated mouse peripheral port 55 is coupled to the mouse host emulator 62 through lines 54 contained in the mouse peripheral security function 36. Lines 54 may have ESD protection means, EMI filters and other electrical and safety protection means not shown here to prevent cluttering. Mouse host emulator 52 enumerate and communicate with the coupled mouse 16 using standard bi-directional peripheral protocol such as USB. Mouse host emulator 52 is a microcontroller, ASIC, FPGA or any other suitable programmable device running a pre-programmed firmware. The firmware is designed to enumerate and enable only mouse class peripheral devices and disable any other coupled devices. For example the following text describes an unknown USB peripheral that is being enumerated by the mouse host emulator 62.

When a USB of an unknown peripheral device is first connected to the keyboard host emulator 62, the USB device enumeration process is started. The enumeration starts by the keyboard host emulator 62 sending a reset signal to the unknown USB device. The data rate of the unknown USB device is determined during the reset signaling. After reset, the unknown USB device's information is read by the Keyboard host emulator 62 and the device is assigned a unique 7-bit address. If the unknown device is supported by the Keyboard host emulator 62 (based on pre-programmed criterions such as device class, sub-class, Vendor ID, Product ID etc), the keyboard device will be activated or enabled, set to a configured state and will establish standard keyboard communications with the Keyboard host emulator 62. If the USB host inside computer I/O Hub/chipset 8 is restarted, or computer is rebooted while the keyboard device is still connected, the above enumeration process is repeated.

Following enumeration and activation, the Mouse host emulator 52 sends all mouse data (horizontal movement, vertical movement, wheel, mouse keys etc) using a standard or proprietary unidirectional serial protocol through unidirectional flow forcing circuitry 56 to the mouse device emulator 58. Both Mouse host emulator 52 and mouse device emulator 58 may be programmed to map and support not only mouse movements but also mouse keys, wheel and any required controls.

The unidirectional flow forcing circuitry 56 may be an optical isolator, electromagnetic isolator, logic driver, RF isolator or any other unidirectional device that may be used to prevent reverse flow of data from mouse device emulator 58 to mouse host emulator 52 and potentially to the mouse dedicated peripheral port 55. Mouse device emulator 58 receives the standard or proprietary unidirectional mouse data and translates it back to a standard bi-directional peripheral protocol such as USB, coupled to the I/O hub or chipset 8 peripheral port line 5a. Mouse device emulator 58 is a microcontroller, ASIC, FPGA or any other suitable programmable device running a pre-programmed firmware. Both mouse host emulator 52 and mouse device emulator 58 may be implemented with ROM (Read Only Memory), Fuse protected flash, One Time Programmable (OTP) or other suitable non-volatile memory technology to prevent re-programming security attacks on controllers from the port 55 side or the I/O hub/chipset 8 side.

Mouse host emulator 52 is programmed to support only mouse (and optionally other pointing) devices. If the user or attacker attempts to connect a hub instead, the device will not be qualified and will be disabled. If the user or attacker attempts to connect a composite device having more than one peripheral functions, the mouse host emulator 52 will enumerate and enable only one mouse device contained in the composite device (if exist). If no mouse device exists in the composite device, the whole device will be disabled.

User authentication device 18 (having a smart-card 20 in this example) is coupled through a cable to a dedicated user authentication peripheral port 51. Dedicated user authentication peripheral port 51 is coupled to the user authentication selector switch 50 contained in the user authentication peripheral security function 38 through lines 74. Lines 74 may have ESD protection means, EMI filters and other electrical and safety protection means not shown here to prevent cluttering. User authentication selector switch 50 is initially couple the user authentication peripheral port 51 to the qualification microcontroller function 31 that also drives the user authentication selector switch 50 through line 151. Qualification microcontroller function 31 enumerates the peripheral device that is coupled to the user authentication peripheral port 51 to determine if it is an allowed device based on pre-programmed qualification criteria.

This pre-programmed qualification criteria may use one or more of the following peripheral device characteristics:
 1. Device class
 2. Device sub-class
 3. Device vendor ID
 4. Device model ID In case that the device is a smart-card reader 18, the pre-programmed qualification criteria applies only to the reader not to the card 20 as the card is qualified and authenticated by the coupled computer.

To enable certain operation flexibility, the user authentication peripheral security function 38 pre-programmed qualification criteria may be partially or full field-programmable. Field programming can be done through a secured device learning process or data entry using various methods. In some embodiment of the present invention initial pre-programming residing on Read Only Memory (ROM) or One-Time Programmable (OTP) memory may include device classes 0Bh (USB smart card reader) and 0Dh (Finger Print Reader) as qualification criteria. More detailed criteria may be field programmer to add device sub-classes, Vendor ID and Product ID for example.

After successful qualification of the coupled smart-card reader device 18, the qualification microcontroller function 31 drives the user authentication selector switch 50 through line 151 to couple the user authentication peripheral port 51 to the peripheral monitoring function 57. The peripheral monitoring function 57 continuously monitors the user authentication peripheral port 51 traffic to detect abnormalities such as device disconnect or device reset. The peripheral monitoring function 57 is coupled on the other side to the computer I/O Hub/chipset 8 through peripheral port line 5f. In case that the peripheral monitoring function 57 detects an abnormal port situation or activity, it signals the qualification microcontroller function 31 through line 53. The qualification microcontroller function 31 then command the user authentication selector switch 50 to couple the port back to the qualification microcontroller function 31.

The peripheral monitoring function 57 may be implemented using one or more of the following exemplary functions:

1. A managed USB hub wherein one downstream port is coupled to the user authentication selector switch 50 and the upstream port is coupled to the I/O hub or chipset 8 peripheral port line 5f. USB hub 57 may be coupled through hub status LED output or I2C management bus 53 to the qualification microcontroller function 31 to report downstream port status and port abnormalities. USB hub may detect and report abnormalities such as: over-current fault, device disconnect, device reset, host reset etc.
2. A microcontroller having upstream and downstream peripheral ports may be used to analyze traffic passed through and detect abnormal situations similar to the USB hub above. The microcontroller 57 may be coupled to the qualification microcontroller function 31 through serial or discrete I/O 53.
3. An FPGA having upstream and downstream peripheral ports may be used to analyze traffic passed through and detect abnormal situations similar to the USB hub and microcontroller above. The FPGA 57 may be coupled to the qualification microcontroller function 31 through serial or discrete I/O 53.

Qualification microcontroller function 31 may be implemented using a microcontroller, ASIC, FPGA or any other suitable programmable device running a pre-programmed firmware. Qualification microcontroller function 31 may be also be implemented to contain additional functions such as the user authentication selector switch 50 the peripheral monitoring function 57. User authentication device disconnect can be detected using electrical or mechanical disconnection detection function that is coupled to the qualification microcontroller function 31 through line 67. This function may detect USB connector disconnection by sensing ground continuity or current flow to the coupled device. This additional monitoring may be needed to augment the peripheral monitoring function 57 during time intervals that device is not enumerated by the computer (for example during computer boot).

It should be noted in the above example only the smart-card reader 18 is being enumerated, qualified and monitored by user authentication peripheral security function 38. The smart-card 20 is not part of this process. Smart-card 20 uses smart-card reader 18 like a pipe or tunnel wherein all traffic is passed through. Smart-card 20 authentication is performed by the computer. Similarly, when reader 18 is a biometric reader such as fingerprint reader, it is generally the reader that is qualified and isolated by the authentication device peripheral security function 38, while the verification and authorization/rejection of the biometric data is performed elsewhere as known in the art.

Optional indicator status light 59 driven by the qualification microcontroller function 31 provides user indication of port status. For example a bi-color LED may be used to provide the following indications:
Off—port is not used
Blinking green—device qualification in progress
Steady green—device qualified and ready for use
Steady red—device is unqualified Optionally, additional port or ports, similar to security function 38 may be implemented to support other dedicated peripheral functions such as touch-screen or document scanner. In this case the qualification controller may be preprogrammed at the factory or in the field to enable device customization. Security function field programming may be protected from unauthorized user modification through user name and password, smart-card, special token etc. To prevent unauthorized use of this dedicated port, the port is enabled only if the connected device is the device defined by the pre-programmed qualification characteristics.

Audio jacks may be removed from secure motherboard 103 to prevent data leakages through audio signals.

Trusted Platform Module (TPM) 130 may be coupled to one or more of the peripheral security functions 36, 37 or 38 through inputs 81x to enable detection, logging and reporting of certain attacks on peripheral ports or peripheral connection/disconnection events. It should be noted that peripheral attack events may be aimed at computer port side (internal attacks) or at the secure port side (external attack). For example—keyboard disconnect and connect event may be reported to prevent potential insertion of a key-logger device between the port and the coupled legitimate keyboard. In case that TPM 130 detected a severe security event, it may lock the computer to prevent further attacks. This lock may be achieved through holding down the computer reset line or disabling any peripheral device traffic.

It should be noted that the exemplary desktop computer system 100 of a preferred embodiment of the present invention does not depend on installed software applications and therefore can provide same security level at pre-boot or with different operating systems.

Unlike the prior-art motherboard 3 of FIG. 1, this secure motherboard 103 does not have any general purpose peripheral ports such as serial, parallel, USB, fire-wire etc. It also does not support any media cards or wireless connectivity such as wireless LAN or Bluetooth.

Figure 3:
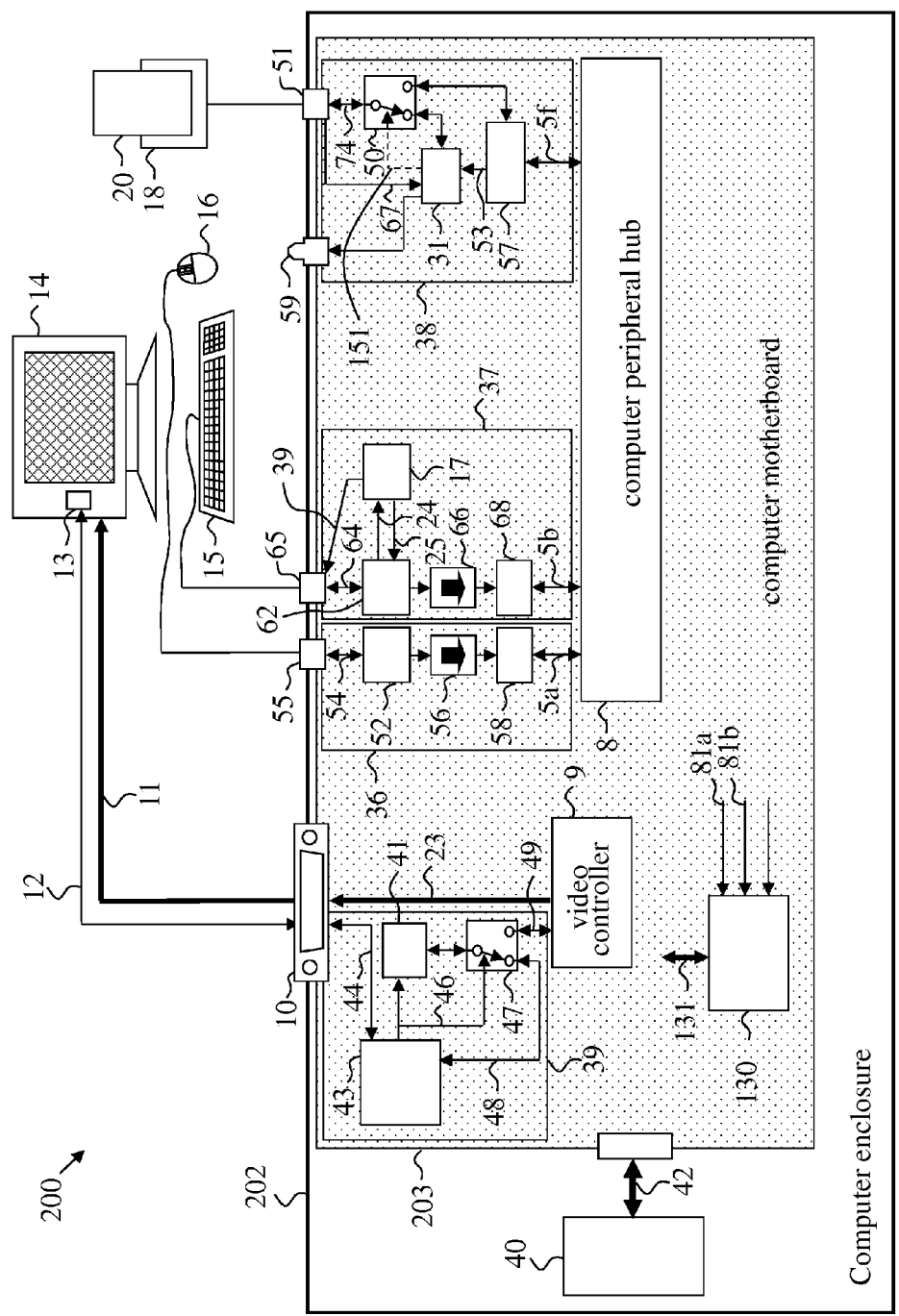
FIG. 3 illustrates a high-level block-diagram of another preferred embodiment of the present invention, similar to FIG. 2 above, and having an additional display EDID security function.

FIG. 3 illustrates yet another high-level block-diagram of an exemplary desktop computer system 200 of the preferred embodiment of the present invention similar to system 100 of FIG. 2 above, having additional EDID security function 39. In this FIG. 3 display connector 10 is coupled to the EDID emulation controller function 43 through EDID line 44.

EDID handling process is based on the following steps:
1. During initial boot of the computer, EDID content from display 14 EEPROM device 13 is read by the EDID emulation controller function 43.
2. After EDID read step completed, EDID content may be checked and qualified by the EDID emulation controller function 43 before writing it into the emulated EDID EEPROM 41.
3. EDID emulation controller function 43 command the EDID mode selector switch 47 to couple the emulated EDID EEPROM 41 data and clock lines to the EDID emulation controller function 43.
4. EDID emulation controller function 43 command disable the emulated EDID EEPROM 41 Write Protect through line 46. Once the Write Protect function is disabled the emulated EDID EEPROM 41 device write is possible.
5. Once EDID content was written and confirmed, EDID emulation controller function 43 enable the emulated EDID EEPROM 41 Write Protect through line 46 (to prevent any attempt to write data into the device) and switches the EDID mode selector switch 47 to couple the emulated EDID EEPROM 41 to the graphic controller 9 through EDID lines 49.
6. Graphic controller 9 detects that display was just connected (although emulated EEPROM 41 connected) and start reading the emulated EEPROM 41 to identify coupled display 14.

This EDID security function 39 shall work efficiently even when computer hard-disk or SSD 40 is infected by a malicious code that instructs the video controller 9 to write data into the display EDID lines. The EDID security function 39 define here blocks any computer attempts to write data into the EDID line, including VESA Monitor Control Command Set (MOOS) data used to control the settings of the coupled display.

It should be noted that the EDID protection function 39 may physically resides (partially or completely) on a separate video card together with video controller 9 and video connector 10. Cable or board to board connector may be used to couple the EDID protection function 39 outputs from the video card to the motherboard 203 TPM 130 inputs 81x.

FIG. 3 also illustrates in greater details the high-level block-diagram of one port power management function of an exemplary desktop computer system 200 of the preferred embodiment of the present invention similar to system 100 of FIG. 2 above. The keyboard peripheral port security function 37 further comprising of a peripheral port power switching function 17 coupled to the dedicated keyboard peripheral port 65 power pins to drive coupled keyboard 15 power. The peripheral port power switching function 17 typically comprising of power switching and protection circuitry to enable safe and efficient control and monitoring of coupled peripheral. Port power enable input 24 allows the keyboard host emulator 62 to enable or disable the power to the port 65. Port over-current output 25 provides indication to the keyboard host emulator 62 that port 65 current consumption has reached a pre-defined critical level and port power is shut-down for safety reasons. Keyboard host emulator 62 may pass this over-current indication in the standard or proprietary unidirectional serial protocol through unidirectional flow forcing circuitry 66 into the keyboard device emulator 68. Keyboard device emulator 68 may further pass this over-current indication to the I/O hub/chipset 8 through port 5b lines to enable proper software handling of port over-current events. This exemplary port power management function may be implemented for each one of the secure dedicated ports to enable secure, safe and reliable ports events handling by computer system 200.

Figure 4:
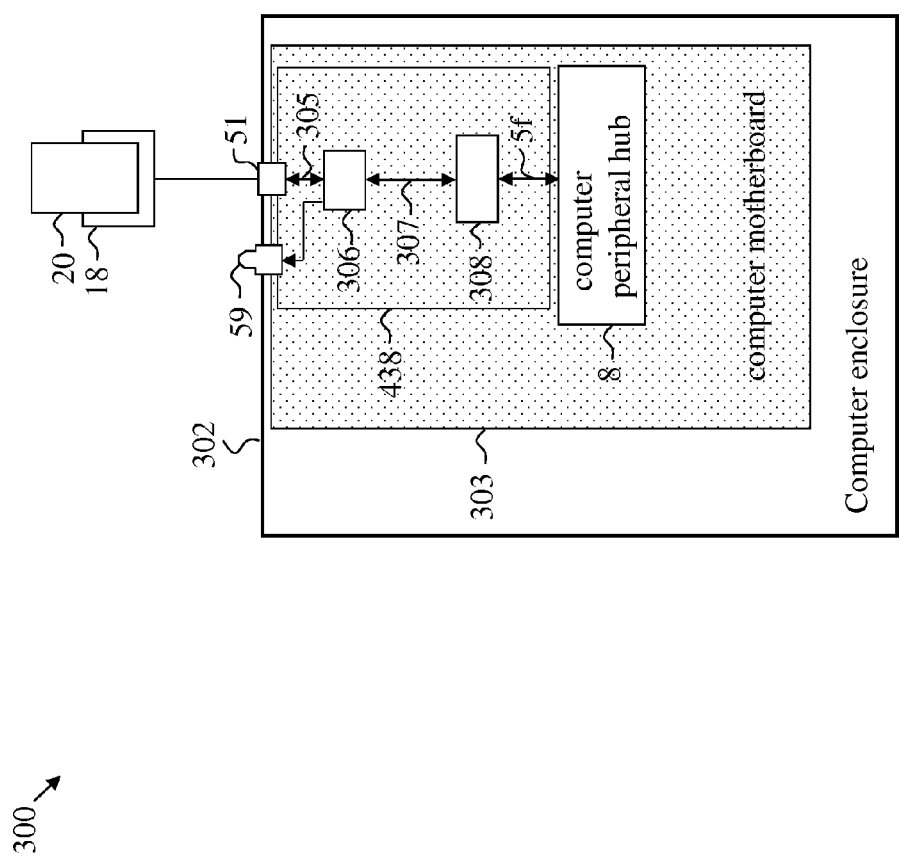
FIG. 4 illustrates a high-level block-diagram of another preferred embodiment implementation of the user authentication device port protection sub-system of this invention.

FIG. 4 illustrates another high-level block-diagram of an exemplary implementation of the User authentication device peripheral security function 438 of a desktop computer system 300 with desktop PC enclosure 302 is having a secure motherboard 303 of the present invention, replacing function 38 depicted in FIG. 3 above (all other functions removed from this figure for clarity). In this implementation the dedicated user authentication device peripheral port 51 is coupled to user authentication host emulator 306 via USB lines 305. USB lines 305 may have ESD protection means, EMI filters and other electrical and safety protection means not shown here. User authentication host emulator 306 emulating a host and communicates using standard or proprietary serial protocol through bidirectional link 307 with the user authentication device emulator 308. The user authentication device emulator 308 translates the standard or proprietary serial protocol back to standard USB protocol coupled to the I/O Hub or chipset 8 through USB peripheral port line 5f.

The embodiment depicted in FIG. 4 requires constructing user authentication host emulator 306 and device emulator 308 that is highly customized to the exact type of card reader 18 and smart-card 20 in use. For this reason this implementation of the current invention is more practical when operational environment is replicated across the organization.

Figure 5:
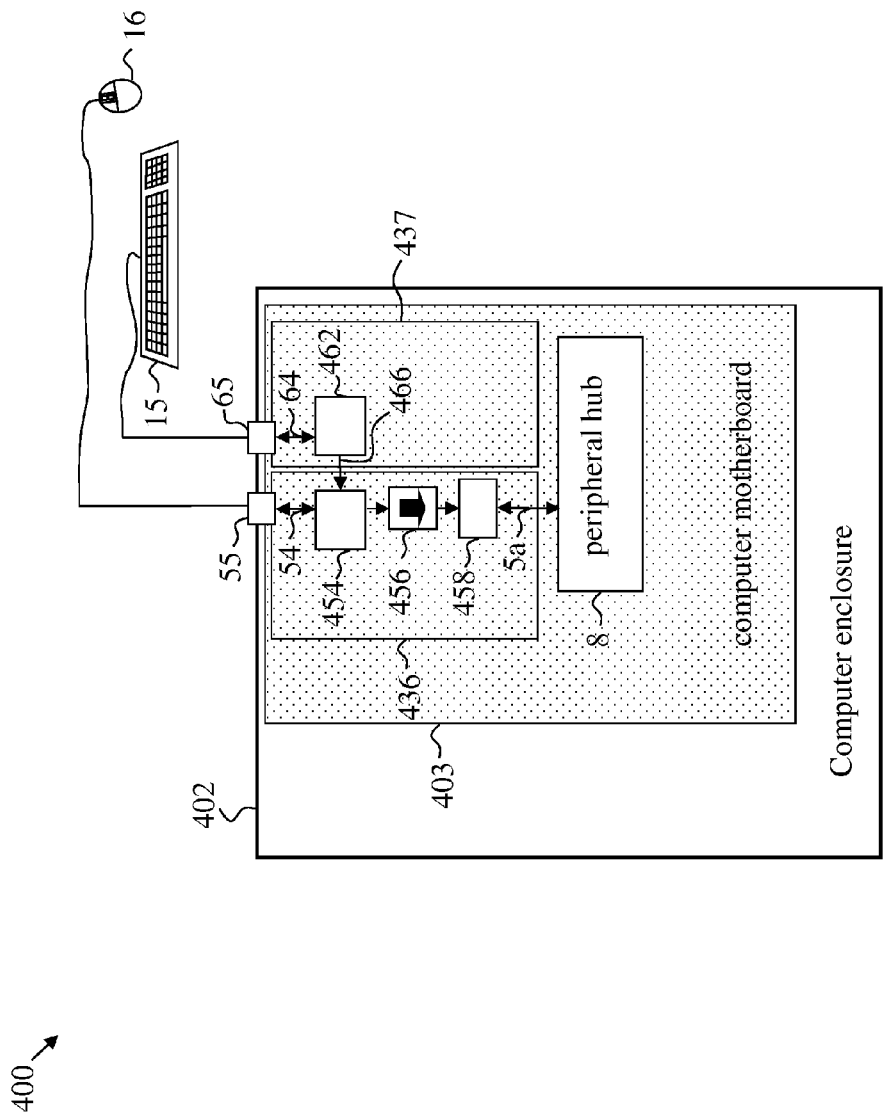
FIG. 5 illustrates a high-level block-diagram of another preferred embodiment implementation of the keyboard and mouse peripheral port protection sub-system of this invention.

FIG. 5 illustrates another high-level block-diagram of an exemplary implementation of the keyboard and mouse peripheral security functions 437 and 436 respectively of a desktop computer system 400. Desktop PC enclosure 402 is having a secure motherboard 403 of the present invention, replacing functions 36 and 37 depicted in FIG. 3 above (all other functions removed from this figure for clarity). In this implementation the keyboard host emulator 462 is coupled to the mouse host emulator 454 through serial link 466. The serial output of the keyboard host emulator 462 combines with the mouse host emulator 454 serial output to form the proprietary or standard unidirectional serial link.

This proprietary or standard unidirectional serial data passes through the unidirectional flow enforcing device 456 and into the combined device emulator 458. The combined device emulator 456 is a composite peripheral device comprising of a mouse and keyboard device that converts the proprietary or standard unidirectional serial data input into a single standard bidirectional data flow coupled through port 5a.

This implementation of the current invention may be used to reduce the number of components and thus reduce the system cost. Additional cost savings may be gained by combining host emulator functions or even all emulators in a single chip but this approach may be more vulnerable to attacks.

Figure 6:
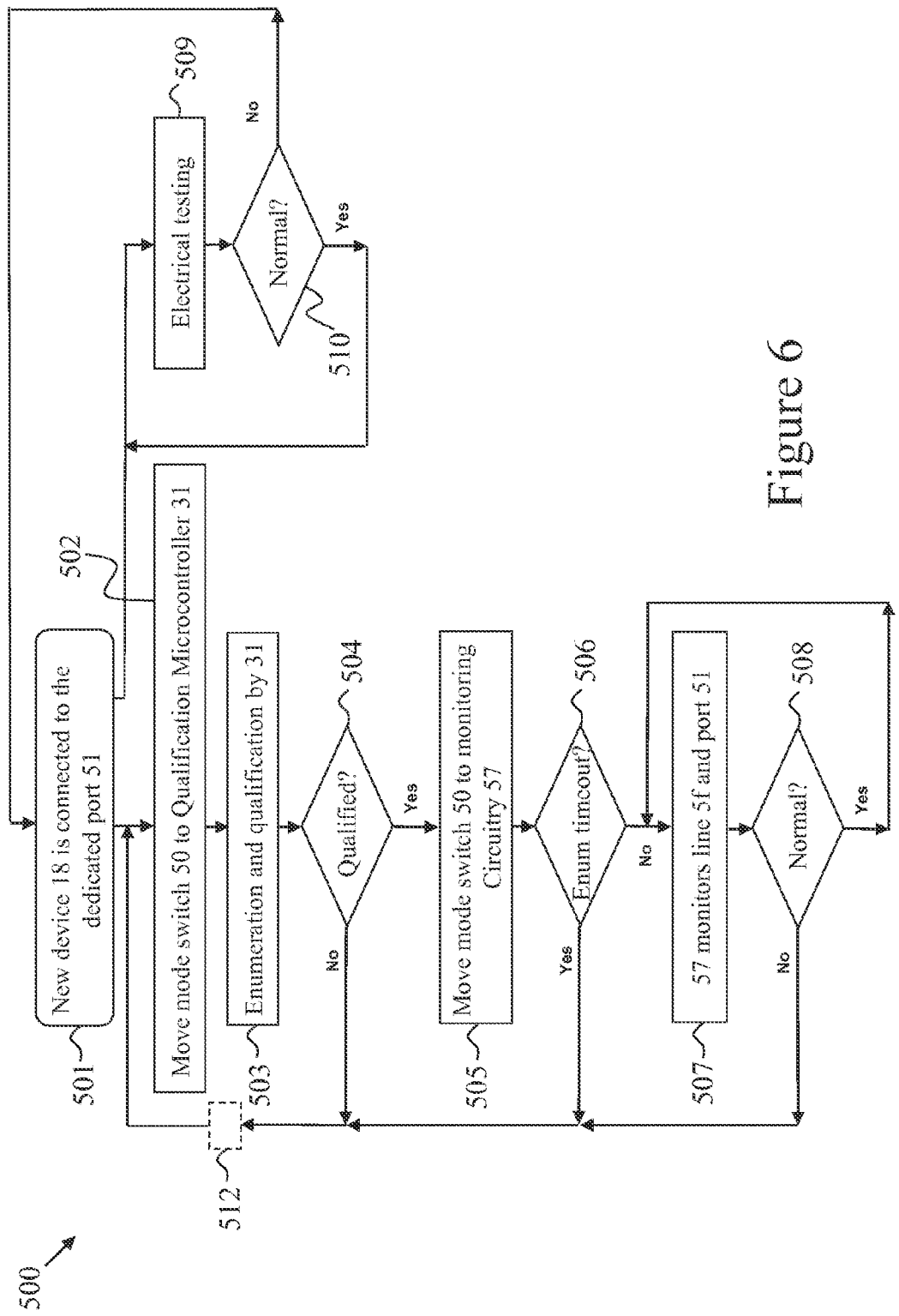
FIG. 6 illustrates an exemplary flow-chart of the initial and on-going processes in the user authentication peripheral port security function of FIG. 2 according to an exemplary embodiment of the current invention.

FIG. 6 illustrates an exemplary flow-chart of the initial and on-going processes 500 in user authentication peripheral port security function 38 of FIG. 2 above. When a new peripheral device 18 is coupled into the user authentication dedicated peripheral port 51 in step 510, the qualification microcontroller function 31 detects the new device and command the user authentication selector switch 50 to couple the new peripheral device into the qualification microcontroller function 31 (step 502).

The qualification microcontroller function 31 then enumerates the new peripheral device and compares its characteristics to a preprogrammed set of qualification parameters (step 503).

Once completed, if new peripheral device is qualified (step 504), process will continue past qualification step 504 to the next step 505. If the new peripheral device is unqualified, the qualification process will restart (jump to step 502) after short delay and appropriate user indication (such as steady red light in LED 59 of FIG. 3 above). If authentication peripheral port security function is coupled to a TPM (130 in FIG. 3), device disqualification event may be reported to the TPM as a security event and security event may be reported to the centralized security management system for further investigation.

In step 505 upon successful qualification, the qualification microcontroller function command the user authentication selector switch 50 to couple the new, now qualified device via line 74 to the peripheral monitoring function 57, where port status is continuously monitored for abnormalities such as port over-current, device reset, host reset, disconnect or failure (step 507).

Before monitoring is done, the computer also needs to enumerate the new qualified device. If the qualified device failed to enumerate by the computer after predefined time interval (step 506), the process will start again at step 502. This failure to enumerate may be used by attackers to attack the peripheral port 51 and therefore it requires qualification restart.

After enumeration by computer host controller in I/O hub or chipset 8, if the peripheral monitoring function detects an abnormality (step 508) it will notify the qualification microcontroller function and the process will start again at step 502.

Optional step 512 is time delay before returning to initial qualification and optional user indication and TPM reporting.

If no abnormality is detected, the smart-card reader continuously coupled to the computer through peripheral port 5f and smart-card authentication interaction may take place.

Another optional process that may run in parallel to the above processes after a new device was connected in step 501 is the electrical testing step 509. In this step the qualification microcontroller function is coupled to one or more electrical or electromechanical detection circuitry that senses device disconnect for example through ground resistance, current draw or other electrical characteristics. Once disconnect is detected or any other abnormality is detected (step 510), the qualification microcontroller function switches back to step 501—waiting for device connection.

Figure 7:
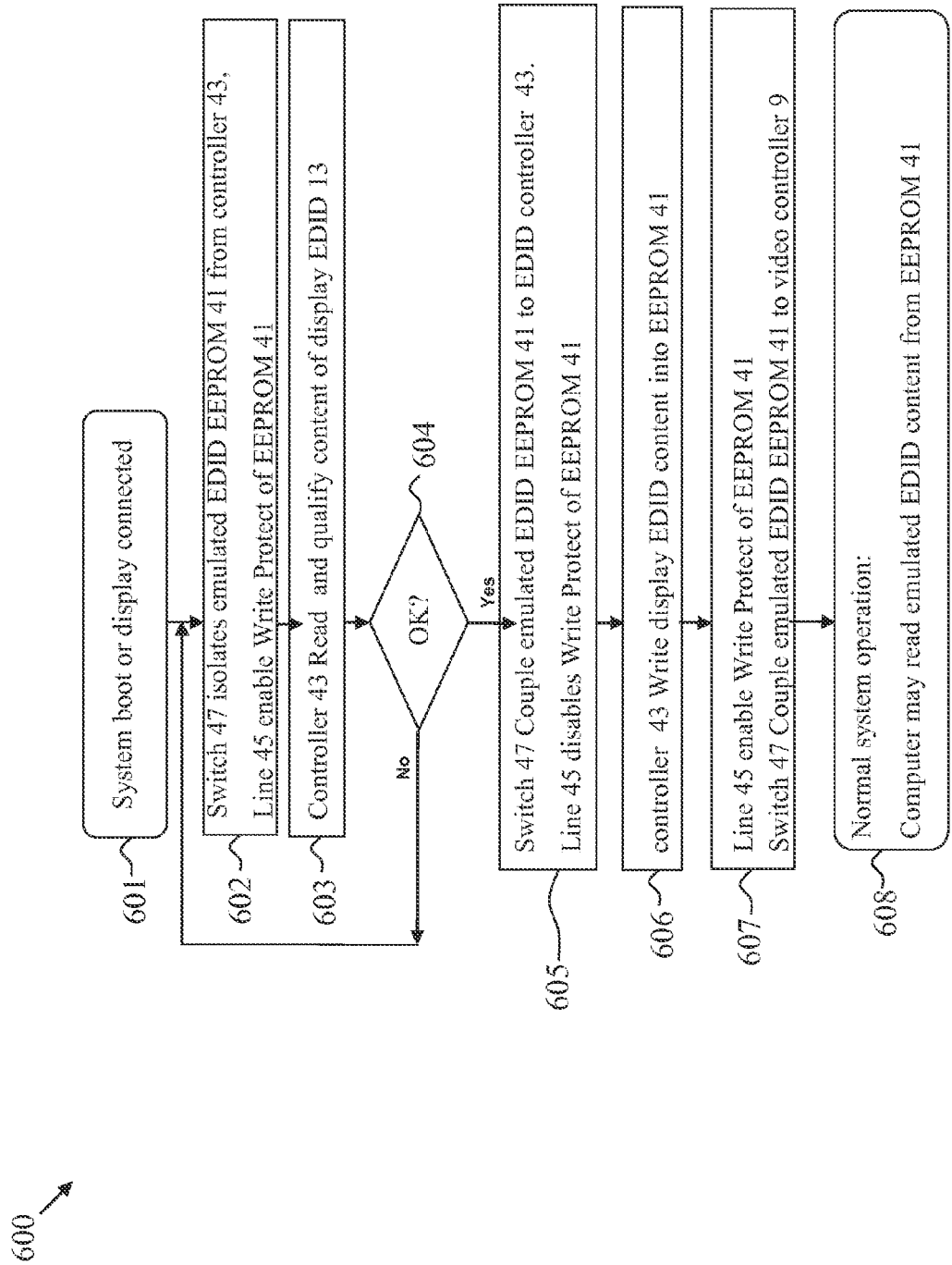
FIG. 7 illustrates an exemplary flow-chart of the initial and on-going processes in EDID security function of FIG. 3 according to an exemplary embodiment of the current invention.

FIG. 7 illustrates an exemplary flow-chart of the initial and on-going processes in EDID security function 39 of FIG. 3 above.

The aim of EDID security function 39 is:
1. To isolate EDID content in EEPROM device 13 of display 14 and video controller chip 9 on motherboard 202, yet allow the system to work as if EEPROM device 13 and video controller chip 9 are connected.
2. To prevent data leakages (import or export) through the EDID lines of the display port 10.

When computer is powered up or display is first connected (step 601), EDID emulation controller function 43 enters read and qualification stage which starts at step 602.

In step 602, EDID mode selector switch (47 in FIG. 3), which is controlled by line 46, isolates the emulated EDID EEPROM device (41 in FIG. 3) data and dock lines from the EDID emulation controller function (43 in FIG. 3). In the depicted embodiment, this is done by switching EDID mode selector switch 47, which is controlled by line 46, such that emulated EDID EEPROM device 41 is connected to video controller chip 9. However, switch 47 may be set to an idle state wherein emulated EDID EEPROM device 41 is not connected at all. At the same time, preferably line 46 disable emulated EDID EEPROM Write Protect in step 602.

In step 603 EDID emulation controller function 43 reads the display EDID content from EEPROM device 13 of display 14.

In step 604 EDID emulation controller function 43 may analyze the EDID content to determine its validity and integrity.

If EDID is not valid, the EDID emulation controller function returns the process back to step 602.

If EDID content is valid EDID emulation controller function continues to step 605.

In step 605 the EDID mode selector switch 47 is moved (due to a command, sent by controller function 43 via control line 46) to couple the emulated EDID EEPROM device 41 to the EDID controller function 43. Emulated EDID EEPROM Write Protect is disabled by line 46 to enable write.

In step 606, EDID content is written into emulated EDID EEPROM device 41, now connected to controller function 43.

In step 607 the EDID emulation controller 43 Write Protects (by line 46) the emulated EDID EEPROM 41, and then move the mode selector switch 47 to couple the emulated EDID EEPROM 41 device to the video controller EDID lines (49 in FIG. 3).

The system enters a normal operation mode in step 608. At this stage, the video controller 9 may read the emulated EDID EEPROM device content from emulated EDID EEPROM 41 as if it was the connected to display EDID device 13. At this stage, emulated EDID EEPROM 41 is write protected, so video controller 9 cannot write data into the emulated EDID EEPROM 41. Additionally, EDID device 13 in display 14, may interact with EDID emulation controller 43, yet there is no data bridge between EDID device 13 and video controller 9.

Preferably or optionally, the secured motherboard according to exemplary embodiments of the invention has a form and size similar or identical to a comparable standard computer motherboard. This form and size preferably includes for example locating mounting holes in the same size type and locations as the standard comparable motherboard. The mechanical similarity enables installing the secure motherboard in identical or minimally modified case and housings designed or manufactured for a standard motherboard.

Preferably or optionally connectors existing on the secure motherboard are in the same size type and locations, as their equivalent connectors on a comparable standard motherboard. The electronic and mechanical similarity enables installing the secured motherboard in identical or minimally modified case and housings designed or manufactured for a standard motherboard. Optionally, case modification comprises providing openings in the case only where actual connectors exist in the secure motherboard.

Optionally, case modification comprises specific identifications of connectors. For example, mouse or keyboard, which may be connected to any USB connector in a standard board, may need to be connected to a specific, designated and marked port in the secured computer according to the invention.

Preferably or optionally, electrical power and other requirements such as cooling, voltages, currents needed for operation of the secure motherboard may be same or similar to comparable standard motherboard.

Preferably or optionally, logical requirements and conditions needed for the operation of the secure computer using the secure motherboard according to the equation are similar or identical to that of a standard comparable computer. For example same operation system and software packages may be executed without any or with minimal modifications and adaptations.

The secure motherboard may comprise features and structures not discussed in herein, for example LAN connection, etc.

Preferably, internal connectors used for example to connect the hard drive are same or similar to the connectors used in a standard motherboard. However, some connectors may be missing or modified to reduce risk of security abuse. For example, expansion slots, and connectors capable of interfacing with additional drives such as additional hard drive or removable media drives (floppy, CD or DVD drives) may be missing or configured for read only.

The invention claimed is:

1. A secure computer comprising:
   an enclosure having at least a secure keyboard peripheral port and a secure mouse peripheral port exposed to outside said enclosure; and
   a computer motherboard inside said enclosure, said motherboard comprising:
      a first peripheral security function to secure said secure keyboard peripheral port comprising:
         a keyboard device emulator coupled to one computer peripheral port to emulate user keyboard;
         a keyboard host emulator coupled to a dedicated user keyboard port to emulate computer host; and
         a unidirectional flow forcing circuitry to assure that data is only flowing from said keyboard host emulator to said keyboard device emulator and no other data may flow from the said keyboard device emulator to the said keyboard host emulator; and
      a second peripheral security function to secure said secure mouse peripheral port comprising:
         a mouse device emulator coupled to one computer peripheral port to emulate user mouse;
         a mouse host emulator coupled to a dedicated user mouse port to emulate computer host; and
         a unidirectional flow forcing circuitry to assure that data is only flowing from said mouse host emulator to said mouse device emulator and no other data may flow from the mouse device emulator to the mouse host emulator.

2. The secure computer of claim 1, and further having an additional user authentication device port security function comprising:
   a user authentication device dedicated peripheral port to connect a qualified user authentication device;
   a user authentication device port peripheral switch to couple said dedicated user authentication peripheral port to a qualification microcontroller function or to one computer peripheral port; and
   a qualification microcontroller to
      emulate computer host to allow coupled user authentication peripheral device enumeration and qualification,
      and upon successful qualification commanding of said user authentication device peripheral switch to couple the dedicated peripheral port to said computer peripheral port.

3. The secure computer of claim 2, wherein said user authentication device port security function further comprises an additional port monitoring circuitry, said additional port monitoring circuitry is coupled to said qualification microcontroller to enable detection of user authentication peripheral device disconnect and to command said user authentication device port peripheral switch to switch back the dedicated peripheral port to said qualification microcontroller.

4. The secure computer motherboard of claim 3, wherein said additional port monitoring circuitry comprises a monitor-able USB hub, and wherein said peripheral switch is coupled to one peripheral port through the monitor-able USB hub.

5. The secure computer motherboard of claim 3, wherein said additional port monitoring circuitry comprises of at least one monitor selected from the group consisting of: mechanical connector detector, device ground detector, and device current detector.

6. The secure computer of claim 1, and further having an additional user authentication device port security function comprising:
   a dedicated user authentication device peripheral port to connect user authentication device;
   a dedicated user authentication device emulator coupled to one computer peripheral port to emulate the user authentication device; and
   a dedicated user authentication device host emulator coupled to the dedicated user authentication device peripheral port on one side and to said dedicated user authentication device emulator on the other side.

7. The secure computer of claim 1, and further having at least one additional peripheral security function to support another pre-defined peripheral device, said additional peripheral security function circuitry is coupled to a qualification microcontroller to enable detection of said additional pre-defined user peripheral device disconnect and to command a coupled additional user device port peripheral switch to switch back the dedicated peripheral port to said qualification microcontroller.

8. The secure computer of claim 7, wherein said qualification microcontroller, host emulator, and device emulator are field programmable to enable field customization to specific peripherals.

9. The secure computer of claim 1 and further having an additional EDID (Extended Display Identification Data) security function comprising:
   an EDID emulation controller function coupled to display connector EDID signals to enable coupled user display EDID content read by said EDID emulation controller function;
   an emulated EDID EEPROM function to store said coupled user display EDID content; and
   an EDID mode selector switch controlled by said EDID emulation controller function and coupled to the emulated EDID EEPROM function via data and clock lines at one side and on the other side coupled to one of the two: EDID emulation controller function or computer video controller chip EDID lines,
   wherein upon power up, said EDID emulation controller function reads the user display EDID content and later it switches the emulated EDID EEPROM using EDID mode selector switch to the EDID emulation controller function and writes the EDID content into the emulated EDID EEPROM function, and once completed writing, it switches the EDID mode selector switch to couple the emulated EDID EEPROM to the computer video controller chip EDID lines.

10. The secure computer of claim 9, wherein said additional EDID security function resides partially in a separate video card that is coupled to the said motherboard.

11. The secure computer of claim 1, and further comprises a TPM (Trusted Platform Module) to provide enhanced computer authentication and trust.

12. The secure computer of claim 11, wherein said TPM is further coupled with a backup battery and one or more switches to detect and report enclosure opening or physical tampering.

13. The secure computer of claim 11, wherein said TPM is further coupled to the said peripheral security functions to detect and report internal or external attacks on peripheral ports.

14. The secure computer of claim 1, and further having audio circuitry and connectors removed to prevent data leakages through audio signals.

15. The secure computer of claim 9, wherein said additional EDID security function resides fully in a separate video card that is coupled to the said motherboard.

16. The secure computer of claim 1, wherein said computer motherboard is capable of performing general purpose computing.

17. The secure computer of claim 1, wherein said computer is selected from a group consisting of: a desktop PC, a thin-client, a server, a laptop, and a tablet.

18. The secure computer of claim 1, wherein peripheral ports that are not secure are not exposed to outside said enclosure.

\* \* \* \* \*